United States Patent [19]

Oshima et al.

[11] 4,442,172

[45] Apr. 10, 1984

[54] INK JET RECORDING SHEET

[75] Inventors: Hiroyo Oshima; Matsukuma Daisaku; Kojima Yutaka; Kobayashi Yukio; Nagai Koichi, all of Tokyo, Japan

[73] Assignee: Jujo Paper Co., Ltd., Tokyo, Japan

[21] Appl. No.: 394,625

[22] Filed: Jul. 2, 1982

[30] Foreign Application Priority Data

Jul. 10, 1981 [JP] Japan ................................ 56-106970

[51] Int. Cl.$^{3}$ ................................................ B32B 5/16

[52] U.S. Cl. ................................ 428/342; 162/181.6; 162/181.7; 162/156; 162/135; 346/135.1; 428/331; 428/211; 428/207; 428/328

[58] Field of Search ............... 428/535, 207, 211, 328, 428/330, 331, 336, 337, 195, 199, 342; 427/264, 270, 271; 162/181.7, 181.6, 156, 135, 142; 346/135.1

[56] References Cited

U.S. PATENT DOCUMENTS 4,269,891 5/1981 Minagawa ........................... 428/335

4,308,542 12/1981 Maekawa et al. ................... 162/146

FOREIGN PATENT DOCUMENTS 53-49113 of 1978 Japan .

1426341 7/1973 United Kingdom .

OTHER PUBLICATIONS

IBM Technical Disclosure Bulletin, vol. 21, No. 6, Nov. 78, "Substrate for Colored Ink Jet Printing".

*Primary Examiner*—George F. Lesmes

*Assistant Examiner*—E. Rollins Buffalow

*Attorney, Agent, or Firm*—Koda and Androlia

[57] ABSTRACT

Ink jet recording sheet comprising more than 1 $g/m^2$ (as solid content) of water-soluble polymer coated onto the surface of a base sheet comprising uniformly 15–45 wt. parts of synthetic silicate 0.1–1 wt. part of a wet strength additive and 2–10 wt. parts of a particular glass fiber with respect to 100 wt. parts of wood pulp. This ink jet recording sheet provides superior ink absorbency and high recording density without feathering and also has superior stiffness and dimensional stability.

7 Claims, No Drawings

INK JET RECORDING SHEET

BACKGROUND OF THE INVENTION

1. Field of the Invention

The present invention relates to a recording sheet suitable for ink jet recording, and more specifically, to an ink jet recording sheet wherein the ink droplets which have been deposited on the surface of a paper are quickly absorbed into the sheet layer with suppression of the spread of an ink dot and a high recording density is hold.

2. Prior Art

The ink jet recording systems using ink jet elements generate almost no noise and are capable of high speed recording. Moreover, they can easily perform a multicolor recording with conventional plain paper. Owing to these features, these recording systems have been widely noted in recent years. And these systems have now been finding a wide range of application, including facsimile equipments, various printers and so on.

Generally, conventional plain paper can be used in the ink jet recording system. In general, the ink jet recording sheet for good recording must have the following two properties:

(1) An ink drop on the sheet surface is quickly absorbed into the sheet layer so that the paper becomes dry.

(2) The spread of an ink dot on the sheet surface is supressed.

The first property mentioned above is the most fundamental requirement in the ink jet recording sheet. In handling the recorded paper, if the ink remained on the sheet surface without being quickly absorbed into the sheet layer, the ink would cause stain. Especially, where a multichromatic recording is carried out, inks with two or more different colors are deposited at one point or very close to each other almost at a time, and consequently the ink amount per unit area on the sheet surface is increased in comparison with a monochromatic recording. Thus, good absorbency into the sheet layer is especially important.

The second property is a requirement for clear recording. It is essential that ink penetrates into the sheet so that the ink spreads into the under surface as well as on the surface of the sheet. On the other hand, optical density of the recorded sheet depends upon the ink amount per unit area of the sheet surface. Thus, optical density of the recorded sheet can be raised by suppressing both the spread of ink dots on the sheet surface and the penetration of ink droplets into the sheet layer.

Generally, the first and second requirements mentioned above are contradictory to each other because the sheet having great ink absorbency have large spreading speed of ink dots on the surface. Therefore, it is desirable to develop the ink jet recording sheet which satisfies the two requirements at the same time. In order to solve the above-mentioned problems, the inventors have proposed, in Japanese Patent Laid-Open No. 49113/1978, to use as an aqueous ink recording sheet, the sheet which was prepared by adding internally a large quantity of the fine powdered urea-formaldehyde resin into wood pulp and then coating water-soluble polymer on the surface. Although ink absorbency of the sheet which was prepared by adding a large amount of the fine powdered urea-formaldehyde resin was very high, its recording surface was a little white in a multicolor recording. That is, the optical density on the recording surface was a little low. Also, the color recording characteristic of this ink jet recording sheet was not always sufficient and besides, urea-formaldehyde resin was much more expensive than conventional fillers.

SUMMARY OF THE INVENTION

Accordingly, it is the general object of the present invention to provide an ink jet recording sheet which has a superior ink absorbency and a high recording density without feathering and which has superior stiffness and dimensional stability.

The above object may be performed by coating more than 1 g/m$^2$ (as solid content) of water-soluble polymer onto the surface of the base sheet comprising uniformly 15–45 wt. parts of synthetic silicate, 0.1–1 wt. parts of a wet strength additive and 2–10 wt. parts of glass fiber of 5–7 $\mu$m diameter and 2–4 mm length with respect to 100 wt. parts of wood pulp.

DETAILED DESCRIPTION OF THE INVENTION

Wood pulps which can be used in the present invention are bleached chemical pulp like NBKP (softwood bleached kraft pulp, NBSP (softwood bleached sulfite pulp), LBKP (hardwood bleached kraft pulp, LBSP (hardwood bleache sulfite pulp), etc., or blended pulp of the bleached chemical pulp with mechnical pulp such as GP (groundwood pulp), TMP (thermo-mechanical pulp), etc., and/or with semichemical pulp such as CGP (chemi-ground pulp), etc.

In the present invention, synthetic silicate is used on a large quantity as an internal additive filler. Synthetic silicate is a white synthetic pigment and contains about 67–71 wt. % of $SiO_2$, about 10–12 wt. % of $Al_2O_3$ and about 6 wt. % of $Na_2O$. Synthetic silicate is industrially obtained under conditions which prevent gelation but yield amorphous discrete particles by the use of acids, alkaline earth metal salts, and aluminum salts. The synthetic silicate is often added as a filler of high grade paper in order to rise opacity of sheet, but in this case the addition rate lies in such amount that 10 percent or less or ash in finished sheet is obtained. In the present invention, 15–45 wt. percent of synthetic silicate based on dry weight pulp is added to the base sheet of the ink jet recording sheet. Thus, in the internal filling of synthetic silicate on a large quantity, the base sheet for the ink jet recording sheet has features of improved bulk, increased ink absorbency and suppressed spread of ink dots. Further, synthetic amorphous silica of a kind of filler for high grade paper, in contrast to synthetic silicate, has not such excellent features, since the spread of ink dots on the sheet surface can not be suppressed. The, the internal addition of a large amount of clay, talc, calcium carbonate, etc. usually used (as internal filler gives a slightly improved bulk and can not suppress the spread of ink dots. In the case in which 20 weight percent of filler, based on the dry weight pulp, are added internally, it is desirable to prevent lowering of sheet strength by adding some quantity of NBKP.

Moreover, in the present invention wet strength additives must be added. The wet strength additives are added for the purpose of preventing the web strength lowering caused by filler addition on a large quantity. As wet strength additives, a substance which can enhance the wet strength without degrading the ink absorbency of the sheet itself is desirable. The preferred examples of such substance are polyamide resin, epi-chlorhydrine-modified polyamide resin, ethoxy-modified polyamide resin, glyoxal, melamine resin, modified melamine resin, urea resin, modified urea resin, polyethylene imine, polyethylene imine derivative, dialdehyde starch, etc. The addition amount of these wet strength additives is 0.1–1 weight precent based on the dry weight pulp.

In the present invention, there are used 1–10 wet. percent of glass fiber, based on the dry weight pulp, in order to give stiffness and dimensional stability required for good sheet runnability in the ink jet printer. The glass fiber with 5–7 μm fiber diamter and 2–4 mm fiber length (E-glass known as alkali-free glass for the textile industry) is suitable for the present invention since it has a good dispersibility.

In the present invention, synthetic silicate, a wet strength additive, a glass fiber are added to the above-mentioned wood pulp, and the resultant stock is mixed uniformly as much as possible. The ink jet recording base sheet was manufactured by using a usual Fourdrinier paper machine. Then, water-soluble polymer such as oxidized starch, modified starch, polyvinyl alcohol, sodium alginate, carboxymethyl cellulose, a water-soluble cellulose derivative, casein, etc. are coated on the surface of the obtained base sheet by size press system and coater system such as roll coater or coaters of the other type.

The coating of water-soluble polymers prevents the lowering of the color density caused by the large amount of synthetic silicate added internally to the base sheet. It is desirable to coat a water soluble polymer in amount of more than 1 g/m$^2$, preferably 2–5 g/m$^2$, (as solid content) on the recording surface of the base sheet, since the coating of too small amount of water-soluble polymer results in poor prevention of the spread of ink dots. That is, in the ink jet recording sheet of the present invention, it was found that the recording sheet which is superior in stiffness, dimensional stability, spread of the ink dots, color density and contrast, and has highly better ink absorbency, in comparison with conventional sheet, is obtained by combining the internal filling of a large amount of synthetic silicate and if desired, internal filling of glass fiber, with the surface coating of water-soluble polymer.

Hereinafter, the present invention will be described by way of the following examples. Still, the ink jet recording was performed by the use of Panafex 6000 manufactured by Matsushita Graphic Communication System Inc. in order to test the quality of the recording sheet of the present invention. The recording method is as follows. By using two ink guns, dicolors recordings of red and black were performed in such a way that first only the red ink is spouted for ten seconds, then the two inks of red and black are spouted for five seconds, lastly the block ink is spouted for ten seconds. Each of resultant red and black recordings has a recording width of 24 mm, and the overlapping part of red and black recordings in the middle has a recording width of 8 mm. Three following properties were tested on the recorded sheets, whereby ink dot diameter was evaluated on the sheet recorded by the other type printer, as described hereinafter.

1. Optical Density

The optical density of part recorded with red color is measured by a Macbeth Reflectometer using filter for magenta color (green filter, Wratten No. 58) and filter for yellow color (blue filter, Wratten No. 4).

The optical density of part recorded with black color is calculated as the sum of the optical densities of each color-recorded part obtained by Macbeth Reflectometer using filter for black color (visual filter, Wratten No. 106).

2. Feathering

The feathering and the overflow of the ink at a boundary part where the inks of red color and black colors lay one over another, are evaluated as follows: A: best, B: common, C: bad, D: very bad.

3. Ink dot diameter

Letters "A" and "B" are recorded 25 times alternatively by using ink jet printer (R-180, manufactured by KONISHIROKU PHOTO IND. CO., LTD.).

The ink dot area of 50 letters is measured by using with particle analyser (Lusex 450, manufactured by Japan Regulator Co., Ltd.), and the average ink dot diameter is obtained by calculating the area per ink dot.

EXAMPLE 1

As a raw material pulp, 20 wt. parts of NBKP having freeness (CSF) of 300 ml and 80 wt. parts of LBKP having a freeness (CSF) of 300 ml were blended.

3 wt. parts of glass fiber having 3 mm fiber length and 6 μm fiber diameter (DE-Fiber, manufactured by Nitto Boseki Co., Ltd.), 30 wt. parts of synthetic silicate (ZEOLEX 17S, manufactured by J. M. Huber Corporation) and 0.5 wt. part of polyamide-empichlorhydrine resin (Kymene 557, manufactured by DIC-Hercules Inc.) as a wet strength additive were added to the raw material pulp.

Using a Fourdrinier type paper machine, a base sheet (No. 1) was prepared at a weight of 60 g/m$^2$ by usual method.

As reference example (No. 2), another sheet was prepared by adding ground calcium carbonate (Super SS, manufactured by Maruo Calcium Co.) in equal amount instead of the synthetic silicate.

By coating oxidized starch (Oji Ace B, manufactured by Oji Cornstarch Co., Ltd.) at 4.5 g/m$^2$ and 4.0 g/m$^2$ (as solid content) on each sheet, the coated sheet No. 3 of the present invention and the coated sheet No. 4 of reference example were obtained.

The ink jet recording was performed on each resultant sheet and commericially fine paper.

The test results are shown in Table 1.

As seen from Table 1, the recording sheet No. 3 of the present invention provides a small ink dot diameter on the sheet surface without feathering, has excellent optical density after recording and has superior ink jet recording properties.

On the contrary, the sheet No. 1 without surface coating has no feathering, but exhibits a slightly large ink-dot diameter and a little poor optical density.

The sheet No. 2 in which calcium carbonate was filled internally has good optical density, but has a large ink-dot diameter with some feathering. The sheet No. 4 coated on the sheet No. 2 provides similar recording properties to sheet No. 2 and does not exhibit no surface-coating effect.

The commercially fine paper (No. 5) exhibits considerable feathering and unclear recording owing to inferior ink absorbency, although it has excellent optical density and ink-dot diameter.

REFERENCE EXAMPLE 1

15 wt. parts of synthetic silicate (ZEOLEX 17S, manufactured by J. M. Huber Corporation) and 0.3 wt. part of urea-formaldehyde resin (Uramin P-150, manufactured by MITSUI TOATSU Chemicals, Inc.) as a wet strength additive were added to 100 wt. parts of LBKP having a freeness (CSF) of 350 ml.

Using Fourdrinier paper machine, a base sheet of a basis weight of 60 g/m$^2$ is prepared by usual method.

Another sheet was prepared by using clay (first class material, manufactured by KYOWA CLAY KABUSHIKI KAISHA) instead of the synthetic silicate. By coating 3.0 g/m$^2$ (as solid content) of casein on each sheet with size press system, the sheet (No. 6) of and the sheet (No. 7) of reference examples were obtained.

The ink jet recording was performed on the obtained sheets. The test results are shown in Table 2.

The sheets No. 6 and No. 7 exhibit excellent optical density, although they have a slightly inferior stiffness owing to sheets prepared without glass fiber addition. The recording sheet (No. 7) exhibits some feathering and bad sharpness of image as disadvantages, since the spread of ink dots is large.

The recording sheet (No. 6) has not such disadvantages and exhibits excellent recording results.

EXAMPLE 2

As a raw material pulp, 20 wt. parts of NBKP having a freeness (CSF) of 400 ml and 80 wt. parts of LBKP having a freeness (CSF) of 350 ml were blended. 5 wt. parts of glass fiber having 3 mm fiber length and 6 μm fiber diameter (DE-Fiber, manufactured by Nitto Boseki Co., Ltd.), 5–55 wt. parts of synthetic silicate (ZEOLEX, manufactured by J. M. Huber Corporation) and 0.5 wt. part of dialdehyde starch (CALDAS No. 5, manufactured by THE JAPAN CARLIT CO., LTD.) were added to the raw material pulp. Using a Fourdrinier type paper machine, a base paper was prepared at a weight of 60 g/m$^2$ by usual method to obtain five kinds of sheets into which different amounts of synthetic silicate were added.

A solution of a mixture consisting of casein and oxidized starch in a portion of 20:80 was used as a surface sizing agent. The surface sizing agent was coated on each sheet in amount of application of 4.0–5.0 g/m$^2$ by the size press system, and then surface coated sheets No. 8–No. 12 were obtained.

In this case, sheets No. 8 and No. 12 are reference examples in amount of synthetic silicate addition of 5 wt. parst and 55 wt. parts, respectively.

According to Table 3 as test results of the sheets, the amount of synthetic silicate addition has a great effect on the cleaness of recorded image. Obviously, the amount of synthetic silicate addition without the range specified by the present invention provides inferior ink absorbency and causes feathering.

TABLE 1

| Kind of recording sheet No. | | Composition of sheet: Pulp (wt.-parts) Soft-wood pulp | Hard-wood pulp | Glass fiber (wt.-parts) | Filler (wt.-parts) | Wet strength additive (wt.-parts) | Polymer for surface coating (g/m$^2$) | Evaluation of recorded sheet: Optical density | Feath-ering | Dot diameter on sheet surface (μm) |
|---|---|---|---|---|---|---|---|---|---|---|
| 1 | Reference example | 20 | 80 | 3 | Synthetic silicate 30 | Polyamide epi-chlorhydrine resin 0.5 | — | 2.85 | A | 190 |
| 2 | Reference example | 20 | 80 | 3 | Calcium carbonate 30 | Polyamide epi-chlorhydrine resin 0.5 | — | 2.98 | B | 195 |
| 3 | Example | 20 | 80 | 3 | Synthetic silicate 30 | Polyamide epi-chlorhydrine resin 0.5 | Oxidized starch 4.5 | 3.00 | A | 180 |
| 4 | Reference example | 20 | 80 | 3 | Calcium carbonate 30 | Polyamide epi-chlorhydrine resin 0.5 | Oxidized starch 4.5 | 3.01 | B | 190 |
| 5 | Reference example | | | | Fine paper | | | 3.15 | D | 180 |

TABLE 2

| Kind of recording sheet No. | | Composition of sheet: Pulp (wt.-parts) Soft-wood pulp | Hard-wood pulp | Glass fiber (wt.-parts) | Filler (wt.-parts) | Wet strength additive (wt.-parts) | Polymer for surface coating (g/m$^2$) | Evaluation of recorded sheet: Optical density | Feath-ering | Dot diameter on sheet surface (μm) |
|---|---|---|---|---|---|---|---|---|---|---|
| 6 | Reference example | — | 100 | — | Synthetic silicate 15 | Urea-formaldehyde resin 0.3 | Casein 3.0 | 3.03 | A | 185 |
| 7 | Reference example | — | 100 | — | Clay 15 | Urea-formaldehyde resin 0.3 | Casein 3.0 | 3.10 | B | 195 |

TABLE 3

| Kind of recording sheet No. | | Composition of sheet: Pulp (wt.-part) Soft-wood pulp | Hard-wood pulp | Glass fiber (wt.-parts) | Filler (wt.-parts) | Wet strength additive (wt.-parts) | Polymer for surface coating (g/m²) | Evaluation of recorded sheet: Optical density | Feath-ering | Dot diameter on sheet surface (μm) |
|---|---|---|---|---|---|---|---|---|---|---|
| 8 | Reference example | 20 | 80 | 5 | Synthetic silicate 5 | Dialdehyde starch 0.5 | Casein-oxidized starch 4.0 | 3.10 | C | 185 |
| 9 | Example | 20 | 80 | 5 | Synthetic silicate 15 | Dialdehyde starch 0.5 | Casein-oxidized starch 4.0 | 3.01 | A | 185 |
| 10 | Example | 20 | 80 | 5 | Synthetic silicate 30 | Dialdehyde starch 0.5 | Casein-oxidized starch 4.5 | 3.00 | A | 175 |
| 11 | Example | 20 | 80 | 5 | Synthetic silicate 40 | Dialdehyde starch 0.5 | Casein-oxidized starch 4.5 | 3.01 | A | 180 |
| 12 | Reference example | 20 | 80 | 5 | Synthetic silicate 55 | Dialdehyde starch 0.5 | Casein-oxidized starch 5.0 | 2.98 | B | 190 |

We claim:

1. Ink jet recording sheet characterized in that 1 $g/m^2$ or more (as solid content) of water-soluble polymer is coated onto the surface of a base sheet comprising a uniform mixture of 15–45 wt. parts of synthetic silicate and 0.1–1 wt. parts of a wet strength additive and 2–10 wt. parts of glass fiber of 5–7 μm diameter and 2–4 mm length with respect to 100 wt. parts of wood pulp.

2. Ink jet recording sheet according to claim 1, wherein said wood pulp is at least one member selected from the group consisting of chemical pulp, semichemical pulp and mechanical pulp.

3. Ink jet recording sheet according to claim 1, wherein said synthetic silicate comprises about 67–71 wt. % of $SiO_2$, about 10–12 wt. % of $Al_2O_3$ and about 6 wt. % of $Na_2O$.

4. Ink jet recording sheet according to claim 1, wherein said wet strength additive is at least one member selected from the group consisting of polyamide resin, epichlorhydrine-modified polyamide resin, ethoxy-modified polyamide resin, glyoxal, melamine-formaldehyde resin, modified melamine-formaldehyde resin, modified urea-formaldehyde resin, polyethylene imine, polyethylene imine-derivative and dialdehyde starch.

5. Ink jet recording sheet according to claim 1, wherein said water-soluble polymer is at least one member selected from the group consisting of oxidized starch, modified starch, polyvinyl alcohol, sodium alginate, carboxymethyl cellulose, a water-soluble cellulose derivative and casein.

6. Ink jet recording sheet according to claim 1, wherein said water-soluble polymer is coated in amount of 2–5 $g/m^2$ onto the surface of said base sheet.

7. Ink jet recording sheet according to claim 1, wherein said water-soluble polymer is coated onto the surface of said base sheet by using size press system or coater system.

* * * * *